A. LATIMER.
AUXILIARY RIM FOR VEHICLE WHEELS.
APPLICATION FILED OCT. 22, 1909.
1,009,423.
Patented Nov. 21, 1911.
2 SHEETS—SHEET 1.
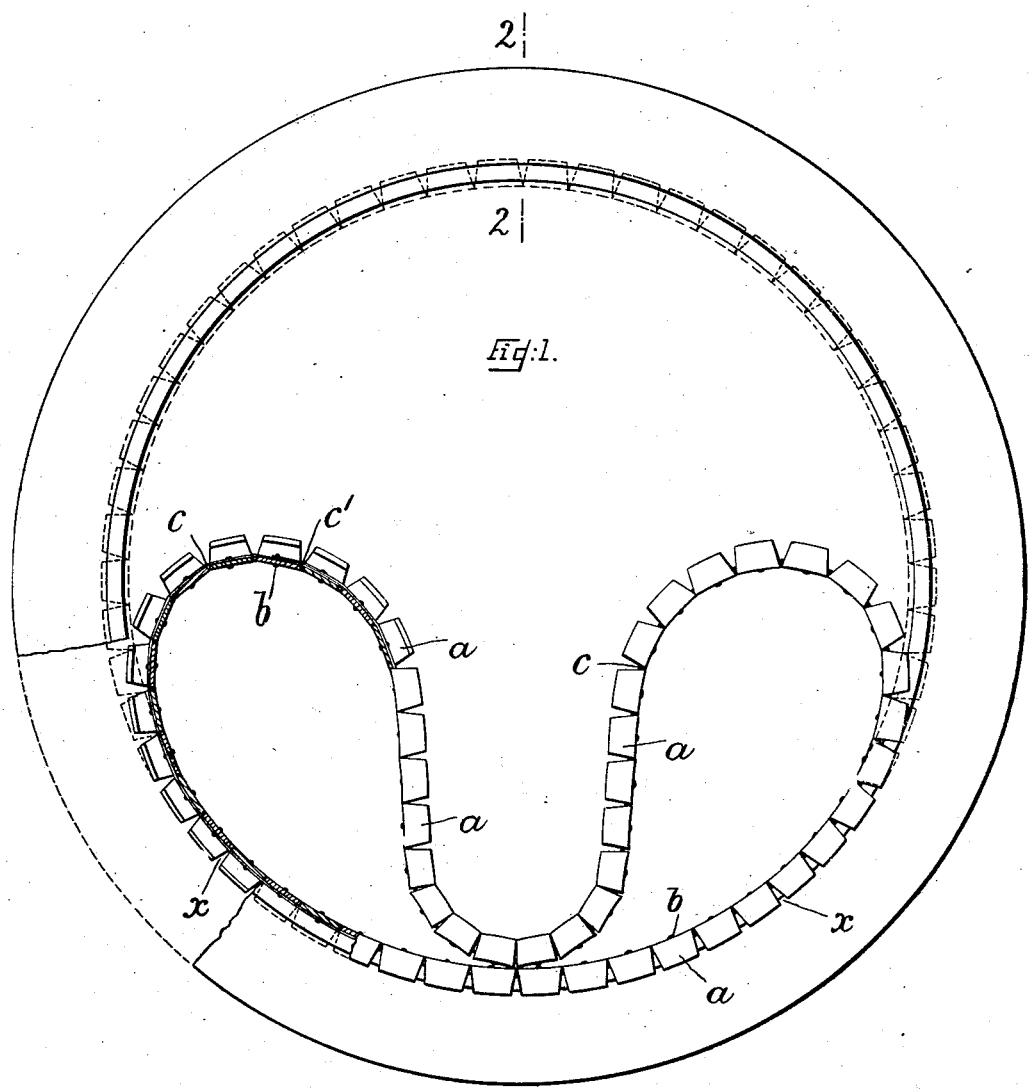
WITNESSES.
INVENTOR,
ALEXANDER LATIMER
Attorney.

A. LATIMER.
AUXILIARY RIM FOR VEHICLE WHEELS.
APPLICATION FILED OCT. 22, 1909.
1,009,423.
Patented Nov. 21, 1911.
2 SHEETS—SHEET 2.
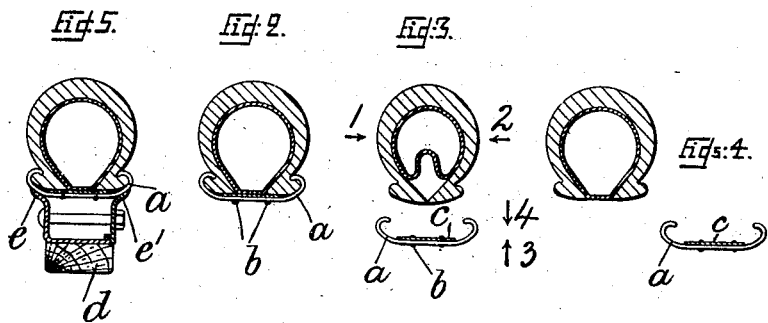
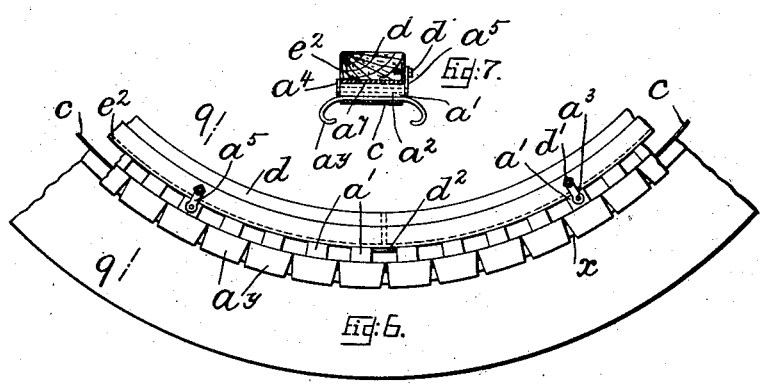
WITNESSES:
INVENTOR,
ALEXANDER LATIMER
by
Attorney.

UNITED STATES PATENT OFFICE.

ALEXANDER LATIMER, OF LONDON, ENGLAND.

AUXILIARY RIM FOR VEHICLE-WHEELS.

1,009,423.   Specification of Letters Patent.   Patented Nov. 21, 1911.

Application filed October 22, 1909. Serial No. 524,010.

*To all whom it may concern:*

Be it known that I, ALEXANDER LATIMER, a subject of the King of Great Britain and Ireland, and a resident of London, England, have invented certain new and useful Improvements in Auxiliary Rims for Vehicle-Wheels; and I do hereby declare the following to be a full, clear, and exact description of the same.

This invention relates to improvements in auxiliary pneumatic-tire-carrying rims adapted to be detachably secured to the wheels of motor car and other vehicles particularly those having removable flanges.

Hitherto, such detachable tire-carrying rims have been made of a rigid formation, which renders difficult the application and removal of the tire respectively thereto and therefrom. Or such rims have been made of segments generally three two of which form an abutment joint which breaks the continuity of the circle and a screw jack or similar special mechanical appliance, has to be used to dislocate the abutting parts to collapse the rim or to expand the rim to locate the abutting parts. Further, special means have to be adopted to fit these discontinuous rims on the wheel and to restrain their radial expansion.

The present invention has for its object to construct a detachable tire-carrying rim which can be more readily applied and removed respectively to and from a tire as and when desired, and which possesses the advantage that no tool is required to perform such operations, and that no special means are required to secure the rim on the wheel, or to restrain its radial expansion.

To this end, the invention consists in forming the rim of a flexible nature radially and of a continuous and inextensible nature circumferentially, so that the rim can be collapsed and sprung into position upon the tire by hand, (much more easily than the tire could be forced over a rigid rim,) and so that when in position upon the tire the rim can be secured in position on a wheel by means of a detachable flange or detachable flanges or in any other customary or suitable manner.

The invention is shown in the accompanying drawings, in which:—

Figure 1 represents a side view of a pneumatic tire fitted with a flexible continuous and inextensible tire-carrying rim. The rim is shown in full lines with part extending around and engaging the bead of the lower part of the tire and with part bent inward away from the tire. The dotted lines represent the bent-in portion engaged with the bead of the upper part of the tire. Fig. 2 represents a section on line 2—2, Fig. 1. Figs. 3 and 4 illustrate diagrammatically the method of applying and removing the rim to and from the tire. Fig. 5 is a similar view to Fig. 2, showing the tire carrying rim applied, by way of example, to a wheel fitted with a known form of removable flange. Fig. 6 represents, by way of example, how the rim may be applied to a wheel felly not having flanges. Fig. 7 represents a section on line 9—9, Fig. 6, but not showing the tire.

In carrying out the invention, the improved tire-carrying rim is constructed of a series or plurality of sections or segments, $a$, shaped channel-like or otherwise in cross section according to the tire to be carried thereby and to the form of wheel or wheel-rim the tire-carrying rim is intended to be used with, and arranged and connected together end to end in annular and continuous form.

The sections or segments are or may be fastened by rivets $b$, or in other suitable manner, to one or more flexible and inextensible retaining bands or rings, $c$, of spring steel as shown. The bands or rings are made continuous without a joint or have their ends meeting and connected together in any suitable manner preferably by being riveted over one another so as to form a lap-joint, as shown at $c^1$.

It will be noted that the sections or segments are made of short lengths and have their ends inclined or chamfered off so as to leave V-shaped spaces, $x$, between adjacent sections or segments to permit of the rim being bent radially inward as indicated, by way of example, in Fig. 1, in applying and removing the same to and from the tire.

The bands or rings exercise a restraining action upon the sections or segments and prevent the expansion of the tire when inflated from displacing the sections or segments, and allow of the free inward radial movement of the sections or segments during the operations of fitting and removing the tire on and from the rim, the operator being able to readily effect said inward action by hand, and the inherent springy nature of the rim facilitating said operations.

When it is desired to apply or remove the rim to or from the tire the tire is compressed sidewise as indicated by the arrows, 1, 2, Fig. 3, whereupon the rim can be moved radially outward or inward as indicated by the arrows, 3, 4, Fig. 3, to apply or remove the same.

Fig. 4 represents the rim and the tire in the operation of applying or removing the former to or from the latter.

In Fig. 5, $d$, represents a wheel felly fitted with a known form of fixed flange, $e$, and removable flange, $e^1$, and the form of construction of the tire carrying rim represented in Figs. 1 and 2, is shown as applied thereto in the customary manner of a rigid endless detachable tire-carrying rim.

In Fig. 6 the tire-carrying rim is shown as applied to a wheel felly not having flanges, but having a plain fixed metal rim, $e^2$. In this case the sections or segments, $a^y$, are provided on their inner peripheral faces with blocks or distance pieces, $a^1$. A sufficient number of these are provided with transverse holes, $a^2$, through which pass spindles, $a^3$, having at their ends, stops, arms or levers, $a^4$, $a^5$, which are preferably rounded on their inner sides to obtain a wedging action and which may be turned radially so as to engage the sides of the wheel felly and hold the tire-carrying rim from lateral displacement, or may be turned tangentially so as not to engage the sides of the wheel felly to permit application or removal of the tire-carrying rim.

The levers are secured in their radial position preferably by bolts or the like, $d^1$, engaging the wheel felly and thus also aid in preventing creeping. The wheel rim, $e^2$, may also be provided with a fixed stop or stops, $d^2$, for this purpose.

The blocks are slightly inclined on their inner faces, $a^7$, to facilitate the application of the tire-carrying rim to the wheel-rim, $e^2$, which may also be complementarily shaped on its outer face.

What I claim as my invention and desire to secure by Letters Patent is:—

An auxiliary tire-carrying rim consisting of a plurality of sections or segments shaped channel-like in cross section and having their ends inclined or chamfered off, a continuous flexible resilient and inextensible retaining band or ring, and means for securing the sections or segments to the band or ring, substantially as described.

In testimony whereof I affix my signature, in presence of two subscribing witnesses.

ALEXANDER LATIMER.

Witnesses:
 ALFRED DAY,
 FREDK. L. RANDS.

---

Copies of this patent may be obtained for five cents each, by addressing the "Commissioner of Patents, Washington, D. C."